March 6, 1945.    R. G. LE TOURNEAU    2,371,055
PIGEON-HOLE RACK TRUCK
Filed April 19, 1943    2 Sheets-Sheet 1
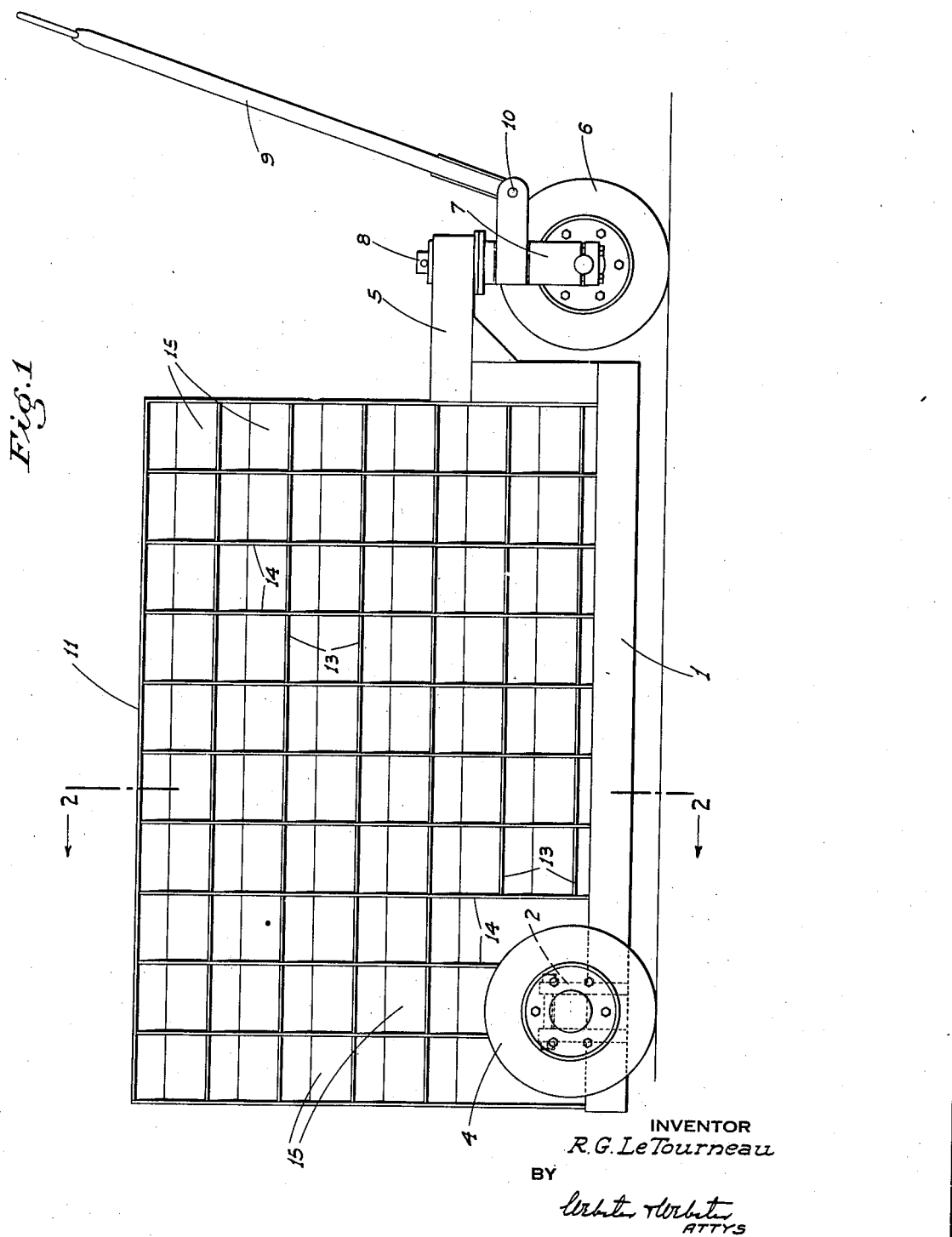
INVENTOR
R. G. LeTourneau
BY
*Arbuter & Arbuter*
ATTYS March 6, 1945.  R. G. LE TOURNEAU  2,371,055
PIGEON-HOLE RACK TRUCK
Filed April 19, 1943  2 Sheets-Sheet 2
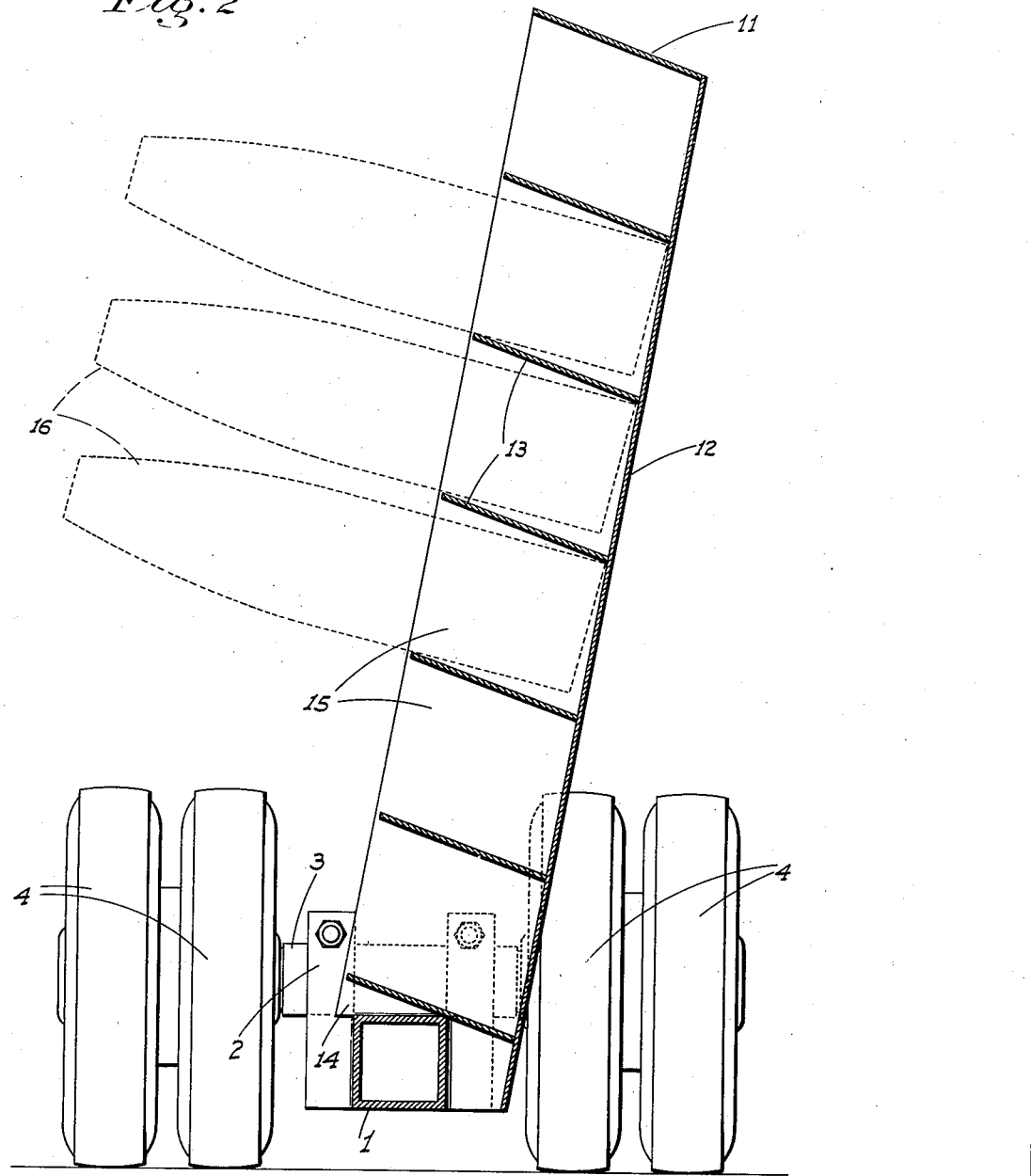
INVENTOR
R. G. LeTourneau
BY
ATTYS Patented Mar. 6, 1945

2,371,055

UNITED STATES PATENT OFFICE 2,371,055

PIGEONHOLE RACK TRUCK

Robert G. Le Tourneau, Peoria, Ill., assignor to R. G. Le Tourneau, Inc., Stockton, Calif., a corporation of California Application April 19, 1943, Serial No. 483,542

6 Claims. (Cl. 280—50)

This invention relates generally to an industrial or factory truck adapted to transport a plurality of like articles in racked relation from point to point as manufacturing operations may necessitate, and in particular the invention is directed to, and it is an object to provide, a factory truck which includes, in combination with a wheel-supported frame, an upstanding pigeonhole rack, each compartment of which is adapted to receive one of the articles to be transported.

A further object of the present invention is to provide a pigeon-hole rack truck, as above, in which the rack is disposed within the pigeonholes or compartments opening laterally of the direction of travel and toward one side of the truck; the rack extending upwardly from substantially the longitudinal center line of the truck and being tilted laterally toward the other side of the truck whereby when heavy, elongated articles of greater length than the depth of the pigeon-holes or compartments are inserted therein, the center of gravity of the load is substantially vertically alined with said longitudinal center line of the truck. The purpose of this arrangement is to assure that the load is not supported against accidental displacement from the rack and yet is not heavier on one side of the truck than the other, avoiding any tendency of the truck to tip sidewise when loaded, and equalizing the weight of the load on the tires of the truck wheels.

An additional object of the invention is to provide a pigeon-hole rack truck, as in the preceding paragraph, in which the rack includes a back wall, and in which the shelves of the pigeon-holes or compartments extend from said back wall at an upward slope; the slope being such that the angle between a given shelf and the back wall of the corresponding compartment is less than 90°.

It is also an object of this invention to provide a pigeon-hole rack truck which includes a horizontal longitudinally extending frame beam disposed adjacent but clear of the ground, an axle mounted in connection with and extending across said frame beam at one end, wheels journaled on the outer end portions of said axle, another wheel horizontally swively mounted in connection with and supporting the frame beam at its other end, and a pigeon-hole rack mounted in supported relation on said frame beam with the pigeon-hole compartments facing laterally of the direction of travel, and with said rack extending upwardly from said beam in tilted relation laterally toward the other side of the truck; there being a pull handle pivotally connected in draft and steering relation to said swively mounted wheel.

A further object of the invention is to provide a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side elevation of the pigeon-hole rack truck.

Figure 2 is an enlarged cross section on line 2—2 of Fig. 1.

Referring now more particularly to the characters of reference on the drawings, the truck comprises an elongated frame beam 1 of box-construction which is disposed horizontally in adjacent but clearance relation to the ground. Adjacent its rear end the beam 1 is suspended in rigid relation by hangers 2 from a transversely extending axle 3 which projects at its ends some distance beyond the beam; said end portions of the axle 3 having dual pneumatic-tired wheels 4 journaled thereon.

At its forward end the beam 1 is formed with a forwardly projecting gooseneck 5 which is supported by and overhangs a pneumatic-tired wheel unit 6 having a mount 7 which includes a vertical spindle 8 journaled in the forward end portion of said gooseneck, whereby the wheel unit 6 is horizontally swively mounted and steerable.

A pull handle or draft tongue 9 is pivotally connected, as at 10, with the mount 7 for vertical swinging movement.

Between the gooseneck and the rear end of the truck the beam 1 supports a pigeon-hole rack, indicated generally at 11, and which includes a back wall 12, spaced longitudinally horizontal shelves 13, and spaced vertical partitions 14 which form the pigeon-holes or compartments 15.

The rack 11 is mounted on beam 1 with the pigeon-holes or compartments 15 opening laterally of the direction of travel and toward one side of the truck, while the rack extends upwardly from beam 1 in laterally tilted relation toward the other side of the truck. The extent of the tilt of the rack is predetermined according to the particular heavy weight, elongated articles to be transported; said articles here being shown as ordnance shells 16 which engage butt end first in said compartments, and which articles are of substantially greater length than the depth of the pigeon-holes or compartments 15. The predetermined tilt of the rack is such that the center of gravity of the load is in substantially vertical alinement with the beam 1, or in other words the longitudinal center line of the truck. This arrangement stabilizes the loaded truck, holds the load against accidental dumping, prevents lateral tipping of the truck, equalizes the weight of the load on the tires, and makes the truck easier to steer and maneuver during forward movement thereof.

In order to further assure against the articles 16 escaping the compartments during movement of the truck, the shelves 13 slope upwardly from their inner edges towards their outer edges at an angle less than 90° relative to the back wall of the corresponding pigeon-hole or compartment 15.

From the foregoing description it will be seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In an industrial truck including a wheel supported frame, and an upstanding material receiving and supporting rack mounted on said frame; the rack being formed with pigeon-holes opening laterally of the direction of travel and toward one side of the truck, and said rack extending upwardly from substantially the longitudinal center line of the truck at a predetermined lateral tilt toward the other side of the truck.

2. A truck as in claim 1 in which the pigeon-holes of said rack are of substantially lesser depth than the length of the articles adapted to be inserted therein; the tilt of the rack being predetermined so that the center of gravity of a load of said articles in the pigeon-holes is substantially vertically alined with the longitudinal center line of the truck.

3. A truck as in claim 1 in which the pigeon-holes are each formed in part by a bottom shelf portion and a back wall portion, said shelf portion sloping upwardly from its inner edge toward its outer edge, the slope being at an angle of less than 90° relative to the corresponding back wall portion.

4. In an industrial truck including a frame, a material receiving and supporting rack mounted on and upstanding from the frame, transversely spaced wheels journaled in connection with the frame adjacent one end of and on opposite sides of the latter, and a horizontally swively mounted wheel secured in connection with and supporting the other end of the frame; the rack extending lengthwise of the frame and being formed with pigeon-hole opening laterally toward one side of the truck, said rack tilting laterally toward the other side of the truck.

5. In an industrial truck including a horizontal, longitudinally extending frame beam, a transverse axle secured to the beam adjacent one end, wheels on the ends of the axle beyond the beam, a gooseneck on the other end of the beam, a supporting wheel beneath said gooseneck, means horizontally swively mounting said supporting wheel in connection with the gooseneck, and a pull handle connected to the mount for said supporting wheel in draft and steering relation thereto; the frame being low hung and elongated and a pigeon-hole rack mounted lengthwise on and upstanding from said beam rearwardly of said gooseneck, the pigeon-holes of said rack opening laterally toward one side of the truck, and the rack being tilted laterally toward the other side of the truck.

6. A rack truck comprising a front wheel unit and a pair of rear wheels, a single beam extending longitudinally of the truck, said beam being supported at its rear end midway between said pair of wheels and supported at its front end by said wheel unit, a pigeon-hole rack fixed to the beam along its length and inclining upwardly and away from and to one side of the beam with the open side of the pigeon-holes thereof facing toward the opposite side, the overhanging weight of the rack when loaded being adapted to be offset by objects loaded into the pigeon-holes and projecting from the open sides thereof, whereby the center of gravity of the rack and its load will be in substantial vertical alignment with the longitudinal center line of the beam.

ROBERT G. LE TOURNEAU.